(12) United States Patent
Nakajima

(10) Patent No.: US 8,949,599 B2
(45) Date of Patent: Feb. 3, 2015

(54) DEVICE MANAGEMENT APPARATUS, METHOD FOR DEVICE MANAGEMENT, AND COMPUTER PROGRAM PRODUCT

(71) Applicant: Masato Nakajima, Tokyo (JP)

(72) Inventor: Masato Nakajima, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/776,891

(22) Filed: Feb. 26, 2013

(65) Prior Publication Data

US 2013/0227276 A1 Aug. 29, 2013

(30) Foreign Application Priority Data

Feb. 28, 2012 (JP) .................................. 2012-042456

(51) Int. Cl.
*H04L 29/06* (2006.01)
*H04L 9/32* (2006.01)
(52) U.S. Cl.
CPC .................................... *H04L 9/3263* (2013.01)
USPC ............................ 713/156; 713/175; 713/158
(58) Field of Classification Search
USPC ........................................................ 713/156
See application file for complete search history.

(56) References Cited

U.S. PATENT DOCUMENTS

| 7,196,610 | B2 * | 3/2007 | Straumann et al. | 340/5.61 |
| 7,996,490 | B2 * | 8/2011 | Kitada | 709/217 |
| 2004/0003238 | A1 * | 1/2004 | Mak et al. | 713/156 |
| 2009/0213819 | A1 * | 8/2009 | Kalhan | 370/338 |
| 2010/0106966 | A1 * | 4/2010 | Santos et al. | 713/156 |

FOREIGN PATENT DOCUMENTS

JP 2009-032277 2/2009

* cited by examiner

*Primary Examiner* — Mohammad L Rahman
(74) *Attorney, Agent, or Firm* — Harness, Dickey & Pierce, P.L.C.

(57) ABSTRACT

According to an embodiment, provided is a device management apparatus that issues a digital certificate to a device. The device management apparatus includes: a storage unit that stores therein device identification information unique to the device in advance; a device-data obtaining unit that, when receiving a connection request from the device, obtains the device identification information contained in the connection request; and a certificate issuing unit that, when the device identification information that is obtained matches up with the device identification information that is stored, issues the digital certificate to the device.

6 Claims, 5 Drawing Sheets

FIG.3A

DEVICE-REGISTRATION DATA TABLE

| MAC ADDRESS | IP ADDRESS | CONTRACT ID | DIGITAL CERTIFICATE ID |
|---|---|---|---|
| 8-0-20-9e-7f-4 | 192.168.0.1 | a001 | 032df342 |
| 8-0-20-9e-7f-7 | 192.168.0.2 | a001 | fdahlj53d |
| 8-0-20-9e-7f-8 | 192.168.0.3 | - | - |
| ... | ... | ... | ... |

FIG.3B

MANAGED-DEVICE DATA TABLE

| CONTRACT ID | MAC ADDRESS | DIGITAL CERTIFICATE ID |
|---|---|---|
| a001 | 8-0-20-9e-7f-4 | 032df342 |
| a001 | 8-0-20-9e-7f-7 | fdahlj53d |
| - | - | - |
| ... | ... | ... |

FIG.3C

CONTRACTOR DATA TABLE

| CONTRACT ID | MAXIMUM NUMBER OF DEVICES | CURRENT NUMBER OF DEVICESS |
|---|---|---|
| a001 | 30 | 25 |
| a002 | 20 | 20 |
| a003 | 30 | 14 |
| ... | ... | ... |

DEVICE MANAGEMENT APPARATUS, METHOD FOR DEVICE MANAGEMENT, AND COMPUTER PROGRAM PRODUCT

CROSS-REFERENCE TO RELATED APPLICATIONS

The present application claims priority to and incorporates by reference the entire contents of Japanese Patent Application No. 2012-042456 filed in Japan on Feb. 28, 2012.

BACKGROUND OF THE INVENTION

1. Field of the Invention

The present invention relates to a device management apparatus, method for device management, and computer program product for issuing a digital certificate to a device to be managed.

2. Description of the Related Art

A form of service, provided by a service provider or the like at a remote location, of remotely managing a network device connected to a user environment has conventionally been known. Known is a technique that enables a device management apparatus that includes such network devices and a management apparatus to collect device data and transmit data to a service provider effectively by installing an agent device (or, a mediation device) in a user environment.

The agent device installed in the user environment is connected to the plurality of network devices that is connected to a private network of the user. The agent device periodically collects device data necessary for management of the network devices on behalf of the management apparatus. The collected data is transmitted to the service provider, which is the management apparatus, to be used in remote management performed by the service provider.

Examples of such a device management apparatus include an image-forming-apparatus management system disclosed in Japanese Patent Application Laid-open No. 2009-032277 that remotely manages a plurality of image forming apparatuses in a local network for which a firewall is built. In this system, a management apparatus remotely manages the image forming apparatuses by utilizing connection with the local network without much increasing equipment cost.

To register a device that is to be managed by such remote device management, it is necessary to register the device via a secure communication path to evade interception of registration information by a third party. A procedure of issuing a digital certificate to the device is required for this purpose. However, has not been disclosed a technique for remotely issuing a digital certificate.

There is a need to provide a device management apparatus capable of remotely and securely issuing a digital certificate to a device to be managed by the system.

SUMMARY OF THE INVENTION

It is an object of the present invention to at least partially solve the problems in the conventional technology.

According to an embodiment, provided is a device management apparatus that issues a digital certificate to a device. The device management apparatus includes: a storage unit that stores therein device identification information unique to the device in advance; a device-data obtaining unit that, when receiving a connection request from the device, obtains the device identification information contained in the connection request; and a certificate issuing unit that, when the device identification information that is obtained matches up with the device identification information that is stored, issues the digital certificate to the device.

According to another embodiment, provided is a device management method for issuing a digital certificate to a device. The device management method includes: storing device identification information that is unique to the device into a storage unit in advance; obtaining, when receiving a connection request from the device, the device identification information included in the connection request; and issuing, when the device identification information that is obtained matches up with the device identification information that is stored, the digital certificate to the device.

According to still another embodiment, provided is a computer program product embodied on a non-transitory tangible computer-readable medium having program codes that, when executed by a computer, cause the computer to perform a device management method described above for issuing a digital certificate to a device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 3A to 3C are data tables illustrating data structures of device management data, data of the managed devices that are under contract, and contract data;

DETAILED DESCRIPTION OF THE PREFERRED EMBODIMENTS

An exemplary embodiment is described in detail below with reference to the accompanying drawings. A device management apparatus according to an embodiment is used in such a case where, for instance, a service provider providing a device management service holds a service contract with a user that desires a device to be managed by the service provider, and provides the management service to the user. When the contract is held, a contract ID is issued to the user. The contract ID allows the service provider to identify which device is owned by which user. The user adds this contract ID to settings of the device to be managed.

Figure 1:
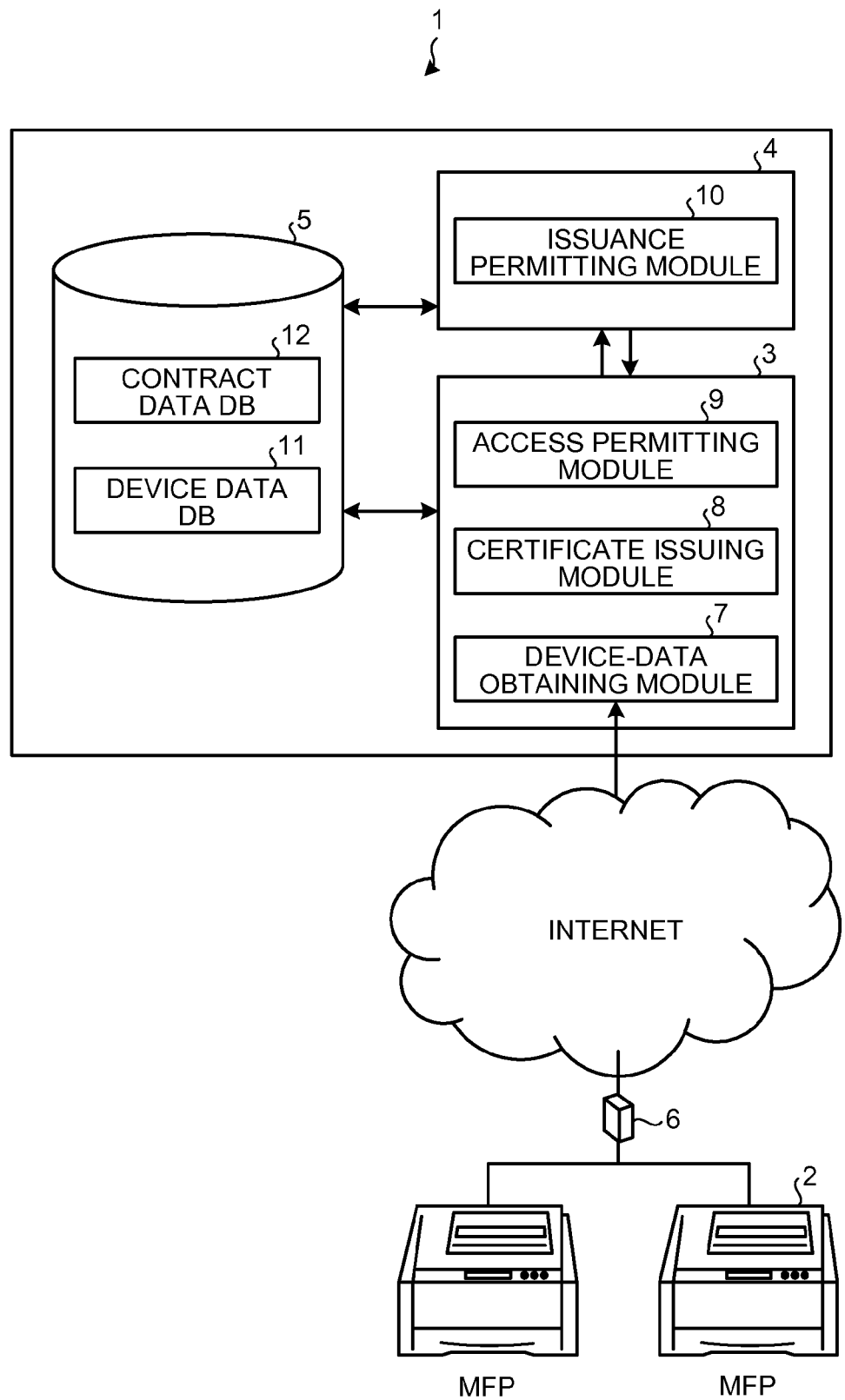
FIG. 1 is a functional block diagram illustrating an entire configuration of a device management apparatus according to an embodiment.

FIG. 1 is a block diagram illustrating an entire configuration of a device management apparatus according to a first embodiment. As illustrated in FIG. 1, a device management apparatus 1 includes: a service server apparatus 3 that is directly connected to a plurality of multifunction peripherals (MFPs) 2 and manages the MFPs 2 via the Internet; an authentication server apparatus 4 that performs authentication; and a storage unit 5 in which various information is stored. The service server apparatus 3, the authentication server apparatus 4, and the storage unit 5 may be provided on independent pieces of hardware or virtually integrated on a single piece of hardware.

The plurality of MFPs 2 are connected to a local network for which a firewall 6 is built. The local network is connected to the Internet via the firewall 6.

The service server apparatus 3 includes a device-data obtaining module 7, a certificate issuing module 8, and an access permitting module 9. The authentication server apparatus 4 includes an issuance permitting module 10. The storage unit 5 stores a device data database (DB) 11 and a contract data DB 12 therein.

The device-data obtaining module 7 obtains device identification information from a connection request issued by the MFP 2 for connection to the device management apparatus 1. The identification information is information unique to each device. In the present embodiment, at least one of a MAC address and an IP address of the device is obtained as the identification information. The device-data obtaining module 7 also obtains a contract ID from the device data DB 11, which will be described later, using the device ID obtained from the connection request. The contract ID is identification information assigned to each of users that receive a management service provided by the device management apparatus 1. The contract ID is unique to each individual user.

The certificate issuing module 8 determines whether the device identification information obtained by the device-data obtaining module 7 matches up with device identification information contained in the device data DB 11 stored in the storage unit 5, and when match occurs, performs a procedure for issuing a digital certificate to the device.

The identification information of the device to be connected to the device management apparatus 1 is stored in the device data DB 11 in advance by the user of the device management apparatus 1 as being associated with the contract ID. Accordingly, when a connection request is issued from the device registered in advance by the user to the device management apparatus 1, the procedure for issuing a digital certificate is started under normal circumstances. The certificate issuing module 8 outputs the device ID contained in the connection request issued by the MFP 2 and the contract note ID obtained from the device data DB 11 to the authentication server apparatus 4.

On receiving the output from the certificate issuing module 8, the issuance permitting module 10 of the authentication server apparatus 4 determines whether to permit the certificate issuing module 8 to issue a digital certificate to the device that has issued the connection request based on the contract ID that it has received. Specifically, the issuance permitting module 10 permits issuing the digital certificate when a current number of devices is smaller than a maximum number of devices connectable to the device management apparatus 1 by which the device is to be managed according to the contract ID stored in the contract data DB 12.

When permitted by the issuance permitting module 10 to issue the digital certificate, the certificate issuing module 8 outputs the digital certificate to the MFP 2. The MFP 2 installs the digital certificate thereon. On receiving a first-time connection request from the MFP 2 on which this digital certificate is installed, the certificate issuing module 8 performs a process for activating the digital certificate.

The access permitting module 9 determines whether to permit the connection requested by the MFP 2. The access permitting module 9 determines whether the digital certificate has been activated based on the digital certificate ID contained in the connection request received from the MFP 2, and permits the connection when the digital certificate has been activated.

Figure 2:
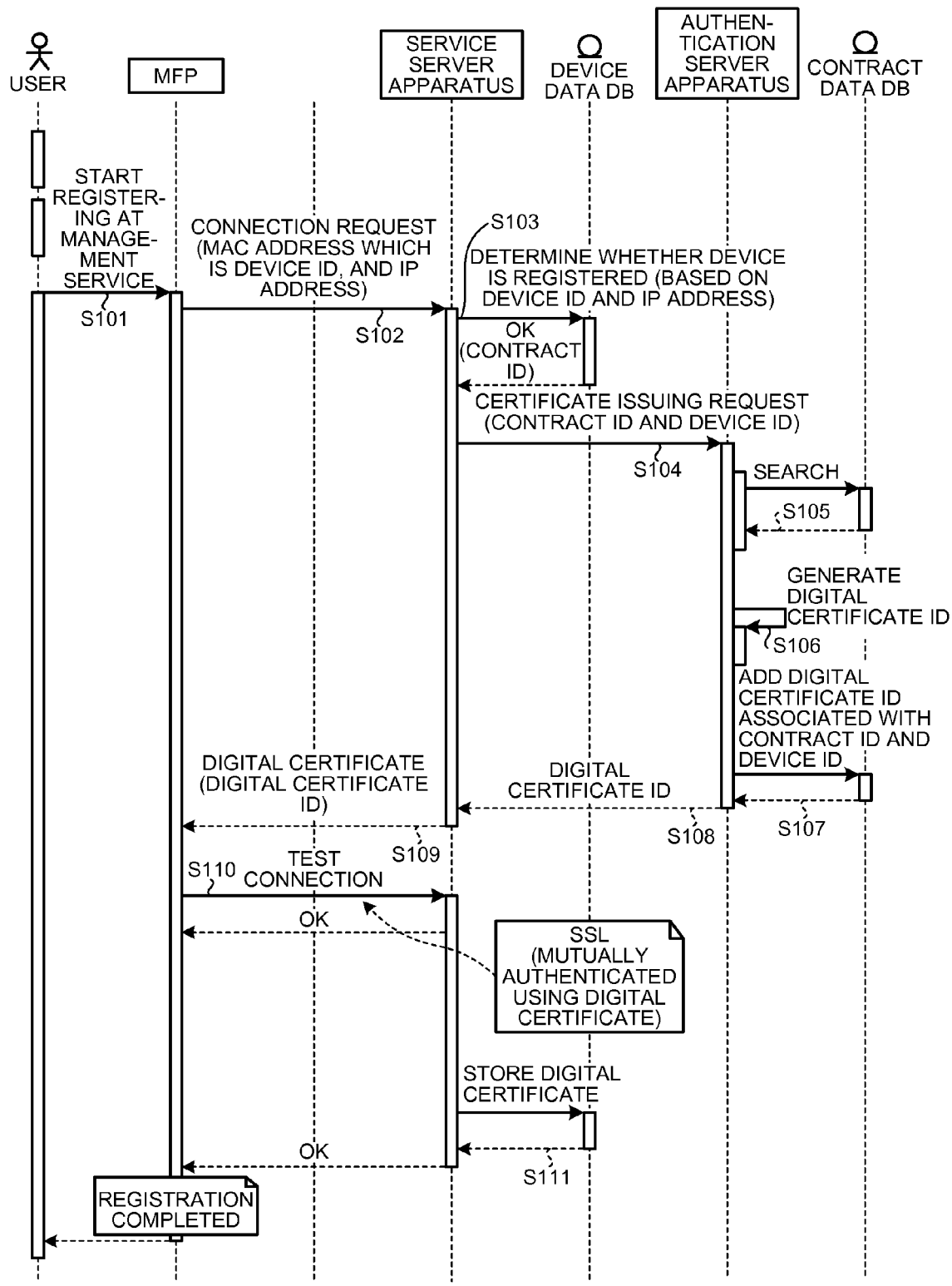
FIG. 2 is a sequence diagram illustrating a procedure for device registration in the device management apparatus.

FIG. 2 is a sequence diagram illustrating a procedure for device registration in the device management apparatus 1.

FIGS. 3A to 3C are data tables illustrating data structures of data stored in the device data DB 11 and the contract data DB 12. Referring to FIGS. 2 to 3C, information flow in a registration process is described in detail below. As a pre-process for the process described below, a user stores data in a device-registration data table in advance illustrated in FIG. 3A. The data to be stored in the device-registration data table is MAC addresses, IP addresses, and contract IDs. A data table for devices under contract that are managed, or managed-device data table, illustrated in FIG. 3B is stored in the contract data DB 12. A record is added to this managed-device data table each time a digital certificate, which will be described later, is issued. The record is not registered until the digital certificate is issued. FIG. 3C illustrates a contractor data table stored in the contract data DB 12. A maximum number of connectable devices preset for each of contractors and a current number of devices are stored in the contractor data table. The current number of devices in the contractor data table is updated each time a digital certificate is newly issued.

First, a user registers the MFP 2 at the management service by operating the MFP 2 (Step S101). The registered MFP 2 outputs a connection request containing an MAC address, which is the device ID, and an IP address to the service server apparatus 3. The device-data obtaining module 7 of the service server apparatus 3 obtains these information (Step S102).

The certificate issuing module 8 of the service server apparatus 3 searches through the device-registration data table in the device data DB 11 using the device ID as a key value to determine whether the MFP 2 that has issued the connection request is a registered device or not (Step S103). When the MFP 2 is determined to be a registered device, the certificate issuing module 8 outputs a certificate issuing request containing the device ID and a contract ID to the authentication server apparatus 4 (Step S104). The contract ID associated with the device ID has been obtained by the certificate issuing module 8 when making access to the device data DB 11.

The issuance permitting module 10 of the authentication server apparatus 4 searches through the contractor data table stored in the contract data DB 12 illustrated in FIG. 3C using the contract ID as a searching key to determine whether a current number of devices, allowed with digital certificate among devices of the user identified by the contract ID, is greater than the maximum number of devices or not (Step S105). When the current number of devices is not greater than the maximum number, the issuance permitting module 10 newly issues a digital certificate and generates a digital certificate ID that is identification information therefor (Step S106).

The issuance permitting module 10 adds the newly-issued digital certificate ID, the contract ID, and the MAC address of the device to the managed-device data table (Step S107); permits the certificate issuing module 8 to issue the digital certificate; and outputs the digital certificate ID to the certificate issuing module 8 (Step S108). Simultaneously, the issuance permitting module 10 updates the current number of devices in the contractor data table. The certificate issuing module 8 issues the digital certificate, and outputs the digital certificate along with the digital certificate ID to the MFP 2 (Step S109).

The MFP 2 granted with the digital certificate establishes test connection with the service server apparatus 3 (Step S110). The test connection is established by carrying out mutually-authenticated communication over SSL using the digital certificate. When the connection is established properly, the digital certificate ID is stored in the device-registration data table of the device data DB 11 as being added to a record associated with the corresponding device ID (Step S111). When addition to the device data DB 11 is properly processed, notification thereabout is transmitted to the MFP 2, and the registration process ends.

Figure 4:
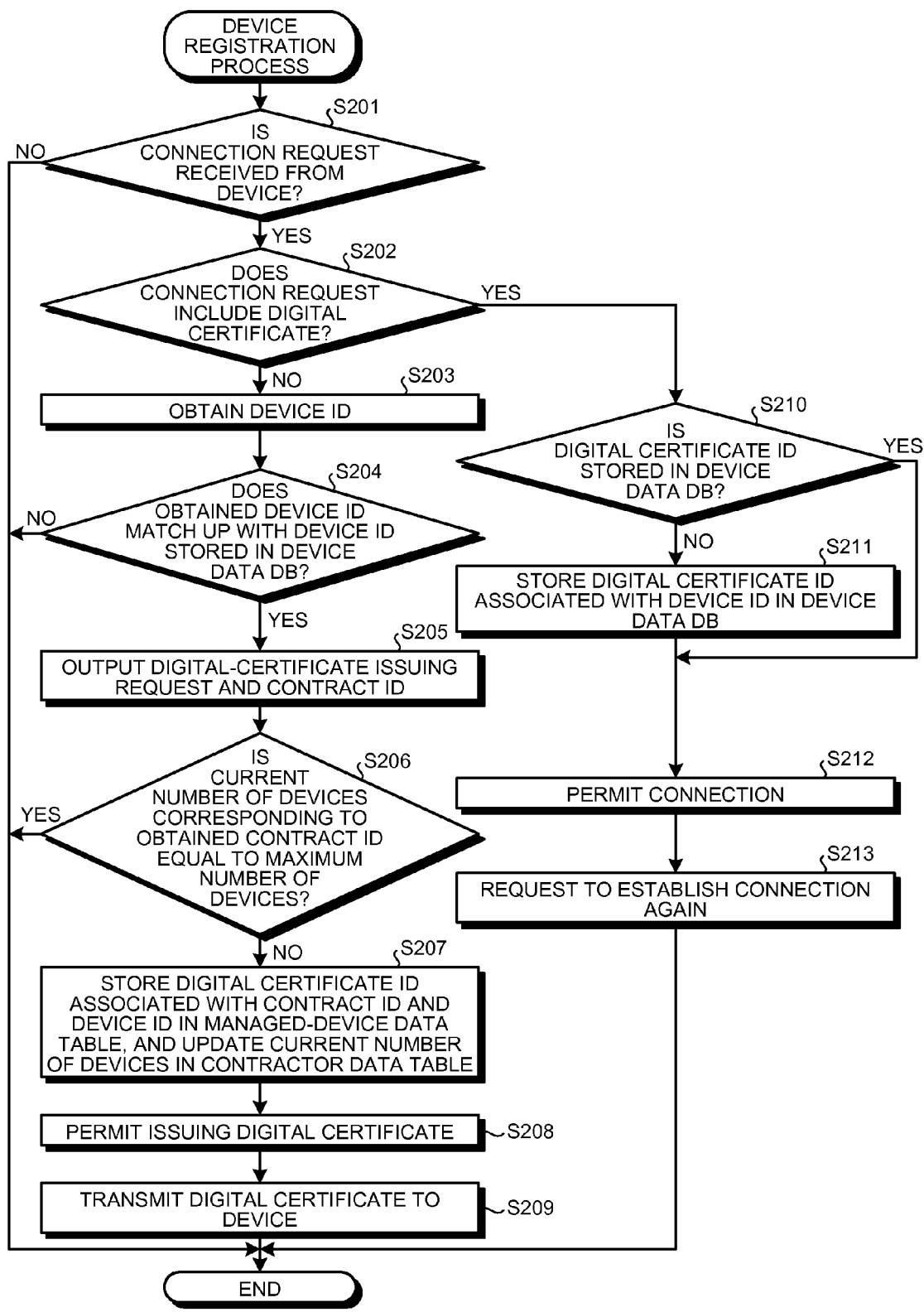
FIG. 4 is a flow diagram of a sequence of operations in a device registration.

FIG. 4 is a flow diagram illustrating the device registration process. As illustrated in FIG. 4, the service server apparatus 3 determines whether a connection request from a device is received (Step S201). When the service server apparatus 3 determines that a connection request is not received (No at Step S201), the process ends. When the service server apparatus 3 determines that a connection request is received (Yes at Step S201), the service server apparatus 3 subsequently determines whether the connection request includes a digital certificate or not (Step S202). When the service server apparatus 3 determines that the connection request does not include a digital certificate (No at Step S202), the device-data obtaining module 7 of the service server apparatus 3 obtains a device ID from the connection request (Step S203). Subsequently, the service server apparatus 3 determines whether the device ID (in the present embodiment, an MAC address) obtained by the device-data obtaining module 7 matches up with a corresponding device ID stored in the device data DB 11 (Step S204).

When the service server apparatus 3 determines that the devices IDs do not match up with each other (No at Step S204), the MFP 2 is judged as not being registered by an authorized user in advance; and the process ends without issuing a digital certificate. On the other hand, when the service server apparatus 3 determines that the devices IDs match up with each other (Yes at Step S204), the certificate issuing module 8 outputs a digital-certificate issuing request and the contract ID obtained from the device data DB 11 to the authentication server apparatus 4 (Step S205). The issuance permitting module 10 determines whether a current number of devices reaches to the maximum number of devices based on the current number of devices in a record corresponding to the contract ID in the contractor data table (Step S206). In practice, this determination is performed using a sum of the number of devices newly added by this registration process and the current number of devices stored in the contractor data table. When the issuance permitting module 10 determines that the current number of devices has reached to the maximum number of devices (Yes at Step S206), issuing a new digital certificate is not permitted. Accordingly, the process ends.

On the other hand, when the issuance permitting module 10 determines that the current number of devices has not reached to the maximum number of devices (No at Step S206), the issuance permitting module 10 stores the digital certificate ID associated with the contract ID and the device ID (MAC address) into the managed-device data table. Further, the issuance permitting module 10 updates the current number of devices in the contractor data table (Step S207). The issuance permitting module 10 permits the certificate issuing module 8 to issue the digital certificate (Step S208). Lastly, the certificate issuing module 8 transmits the digital certificate to the MFP 2 that has issued the connection request (Step S209), and the process ends.

When the service server apparatus 3 determines that the connection request includes a digital certificate (Yes at Step S202), or in other words, when the service server apparatus 3 receives a connection request from the MFP 2 to which the digital certificate has already been issued, the access permitting module 9 determines whether a digital certificate ID associated with the device ID is stored in the device data DB 11 or not (Step S210). When the access permitting module 9 determines that the digital certificate ID is stored (Yes at Step S210), the access permitting module 9 permits the connection of MFP 2 thereto (Step 212). On the other hand, when the access permitting module 9 determines that the digital certificate ID is not stored in the device data DB 11 (No at Step S210), the certificate issuing module 8 adds the digital certificate ID to a record associated with the MAC address of the MFP 2 that has issued the connection request into the device-registration data table of the device data DB 11 (Step S211). The access permitting module 9 requests the MFP 2 to establish connection again (Step S213); and the process ends.

In the device management apparatus 1 according to the present embodiment described above, provided that a user registers a device ID in advance, an operation, which is necessary to cause a digital certificate to be issued to a device to which the device ID is assigned, is only establishing connection from the device. Therefore, the need of installing the digital certificate on the device to be managed in advance before delivery to a client is eliminated; and a management environment can be remotely configured easily. In addition, masquerading by another device can also be prevented because the device management apparatus 1 utilizes information, such as a MAC address, that is unique to each device as the device ID.

Also employable is a configuration in which, even when the device has a digital certificate, connection with the device is rejected if the digital certificate ID of the certificate is not stored in a database that is accessible from a server connected to the device. By this configuration, unauthorized access can be prevented.

The device management apparatus 1 described above can be modified as follows, for example.

In the embodiment described above, the current number of devices is obtained from the contractor data table. Alternatively, the current number of devices may be obtained from the number of records in the managed-device data table.

Although the contract ID is defined as an ID given to a user in advance for identification of the user in the embodiment, any ID assigned only to authorized users can be used. For example, a plurality of IDs assigned to a user on a manager-by-manager basis may be used in lieu of the contract ID. That is to say, any kind of IDs can be used so far as the IDs are of authorized ones.

Figure 5:
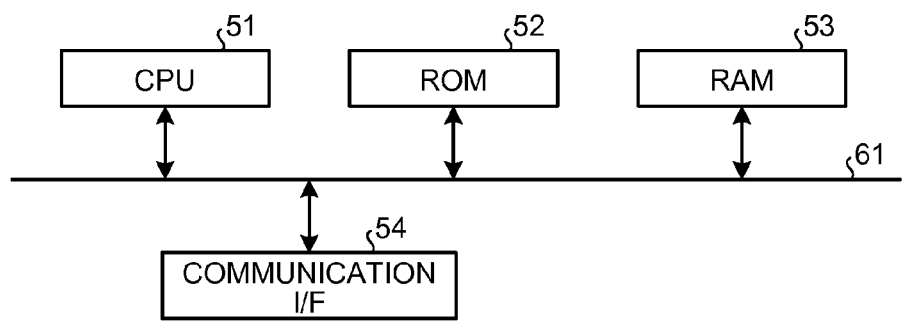
FIG. 5 is a diagram illustrating a hardware configuration of the device management apparatus.

A hardware configuration of the service server apparatus 3 and the authentication server apparatus 4 included in the device management apparatus 1 is described below with reference to FIG. 5. FIG. 5 is an explanatory diagram illustrating the hardware configuration of the service server apparatus 3 and that of the authentication server apparatus 4.

Each of the service server apparatus 3 and the authentication server apparatus 4 according to the present embodiment has the hardware configuration implemented in a typical computer and includes a control device such as a central processing unit (CPU) 51, a storage device such as a read only memory (ROM) 52 and a random access memory (RAM) 53, a communication interface (I/F) 54 for carrying out communication through connection with a network, an external storage device such as a hard disk drive (HDD) and/or a compact disc (CD) drive, a display device, an input device such as a keyboard and/or a mouse, and a bus 61 via which these elements are connected to one another.

Program codes for the device management for execution by the service server apparatus 3 and the authentication server apparatus 4 according to the present embodiment are provided as a computer program product stored in a non-transitory tangible computer-readable storage medium as a file in an installable format or an executable format. The non-transitory tangible computer-readable storage medium can be, for instance, a compact disk read only memory (CD-ROM), a flexible disk (FD), a compact disk recordable (CD-R), or a digital versatile disk (DVD).

The program codes for the device management for execution by the service server apparatus 3 and the authentication server apparatus 4 may be configured to be stored in a computer connected to a network such as the Internet and provided by downloading over the network. The program codes for the device management for execution by the service server apparatus 3 and the authentication server apparatus 4 may be configured to be provided or distributed over a network such as the Internet.

The program codes for the device management for execution by the service server apparatus 3 and the authentication server apparatus 4 may be configured to be provided as being stored in a ROM or the like in advance.

The program codes for the device management for execution by the service server apparatus 3 and the authentication server apparatus 4 have a module structure including the modules described above. From the viewpoint of actual hardware, the CPU (processor) 51 reads out the program codes from the storage medium and executes the program codes to load the modules on a main memory device, thereby generating the modules on the main memory device.

According to an aspect of the embodiment, a digital certificate can be issued securely and remotely to a device to be managed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device management apparatus that issues a digital certificate to a device, the device management apparatus comprising:
a storage unit configured to stores therein device identification information unique to the device in advance;
a device-data obtaining unit configured such that, when receiving a connection request from the device, the device-data obtaining unit obtains the device identification information contained in the connection request;
a certificate issuing unit configured such that, when the device identification information that is obtained matches up with the device identification information that is stored, the certificate issuing unit issues the digital certificate to the device;
a contract-data registering unit; and
an issuance permitting unit, wherein
the storage unit is configured to store therein contract identification information associated with the device identification information, the contract identification information being for identification of a user,
the certificate issuing unit is configured such that, when the obtained device identification information matches up with the stored device identification information, the certificate issuing unit obtains the contract identification information from the storage unit and outputs the contract identification information,
the contract-data registering unit is configured to store therein the contract identification information associated with a maximum number of devices that is a number of devices manageable by the device management apparatus, and a current number of devices that is a number of currently-managed devices, and
the issuance permitting unit is configured to, determine whether the current number of devices associated with the contract identification information output from the certificate issuing unit is smaller than the maximum number of devices, and
when the current number of devices is determined to be smaller than the maximum number of devices, permit the certificate issuing unit to issue the digital certificate.

2. The device management apparatus according to claim 1, wherein
the certificate issuing unit, when a connection request is issued by the device having the digital certificate thereto, stores identification information of the digital certificate as being associated with the device identification information stored in the storage unit, and
the device management apparatus further comprising
an access control unit that,
when the connection request is issued by the device, determines whether a combination of the device identification information contained in the connection request and the contract identification information is stored in the storage unit, and
when the combination is determined to be stored in the storage unit, permits the connection request.

3. The device management apparatus according to claim 1, wherein the device identification information includes a MAC address.

4. The device management apparatus according to claim 1, wherein the device identification information includes an IP address.

5. A device management method for issuing a digital certificate to a device, the device management method comprising:
storing device identification information that is unique to the device into a storage unit in advance;
storing contract identification information associated with the device identification information, the contract identification information being for identification of a user, the contract identification information being associated with a maximum number of devices that is a number of devices manageable by a device management apparatus, and a current number of devices that is a number of currently-managed devices;
obtaining, when receiving a connection request from the device, the device identification information included in the connection request;
when the device identification information that is obtained matches up with the device information that is stored, obtaining the stored contract identification information, outputting the contract identification information, determining whether the current number of devices associated with the contract identification information output from the certificate issuing unit is smaller than the maximum number of devices, and
issuing, when the current number of devices is determined to be smaller than the maximum number of devices, the digital certificate to the device.

6. A computer program product embodied on a non-transitory tangible computer-readable medium having program codes that, when executed by a computer, cause the computer to perform a device management method for issuing a digital certificate to a device, the device management method comprising:
storing device identification information that is unique to the device into a storage unit in advance;
storing contract identification information associated with the device identification information, the contract identification information being for identification of a user, the contract identification information being associated with a maximum number of devices that is a number of devices manageable by a device management apparatus, and a current number of devices that is a number of currently-managed devices;

obtaining, when receiving a connection request from the device, the device identification information included in the connection request;

when the device identification information that is obtained matches up with the device information that is stored, obtaining the stored contract identification information, outputting the contract identification information, determining whether the current number of devices associated with the contract identification information output from the certificate issuing unit is smaller than the maximum number of devices, and issuing, when the current number of devices is determined to be smaller than the maximum number of devices, the digital certificate to the device.

\* \* \* \* \*